March 22, 1932.    G. ERNST    1,850,620
COMBINED GAUGE GLASS PROTECTOR, ILLUMINATOR, AND GLARE ELIMINATOR
Filed Jan. 24, 1929
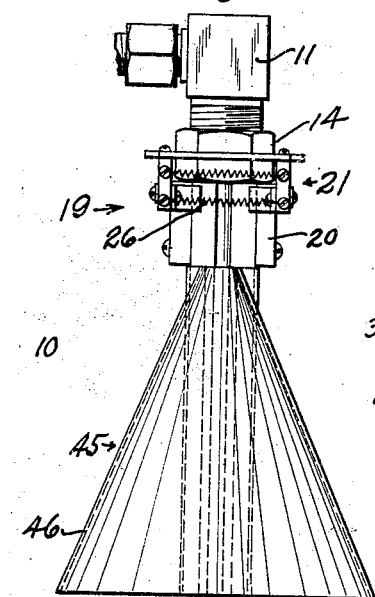
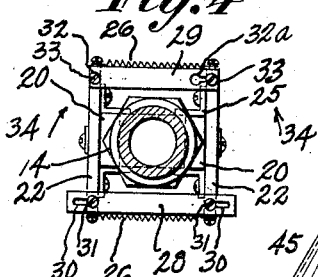
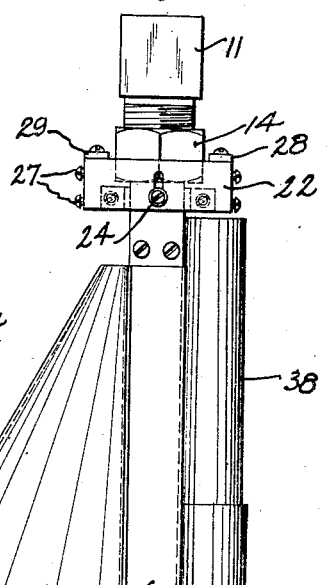
Inventor:
George Ernst
By his attorneys
Beeler & Schumacher Patented Mar. 22, 1932

1,850,620

UNITED STATES PATENT OFFICE

GEORGE ERNST, OF NEWARK, NEW JERSEY

COMBINED GAUGE GLASS PROTECTOR, ILLUMINATOR, AND GLARE ELIMINATOR

Application filed January 24, 1929. Serial No. 334,671.

This invention relates to water gauges.

One object of the invention is to provide a device of the character described having a tubular glass and an improved safety guard therefor.

Another object of the invention is the provision of a device of the nature set forth in which the guard is of improved construction to permit the same to be easily mounted on a gauge and which permits the usual manipulation of the latter, as, for example, for tightening the packing nuts.

Another object of the invention is to construct an improved illuminating device for a liquid gauge.

A further object of the invention is to furnish an improved glare eliminator in a device as set forth.

A further object of the invention is to create a device of the type mentioned having comparatively few parts, which is inexpensive to construct, easy to adjust, rugged and fool proof, and reliable and efficient to a high degree in use.

This invention is particularly applicable to water gauges which are used on high pressure boilers. There is always present the immediate danger that the glass may break and cause injury to the operator by a piece of flying glass. The liability to breakage is largely due to the high pressures and temperatures to which the glass is subjected, initial deformation of the glass, vibrations, and draft causing considerable stresses in the glass. Various types of guards have heretofore been proposed, which have not been satisfactory, and where made of glass, these guards have themselves been broken by impact with pieces of gauge glass. Again, gauges have been made with plane sheets of glass secured within strong metallic housings permitting the water level to be seen through narrow vertical openings in the housings. These, however, have been found to be expensive and difficult to pack. It is a primary object of this invention to construct a gauge which while using the cheaper and more satisfactory tubular gauge glass, shall obtain an effect similar to that of the plane glass gauge mentioned.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view in front elevation of a device embodying the invention.

Fig. 2 is a view in side elevation of the same with parts removed.

Fig. 3 is a horizontal section taken on the line 3—3 of Fig. 1.

Fig. 4 is a similar sectional view taken on line 4—4 of Fig. 1.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, are submitted merely as showing the preferred exemplification of the invention.

Generally described, the invention provides a water gauge having upper and lower heads between which extends a tubular gauge glass having a guard mounted in contact therewith. The guard consists of a pair of channels disposed on opposite sides of the glass and strongly secured thereto. Between the glass, and the webs and flanges of the channels, packing may be placed. The free edges of the flanges are spaced from each other forming narrow openings on opposite sides of the glass for easy observation of the water level. An illuminating device lights up the water column, the light being confined thereto. A hood acts to eliminate glare on the glass from an outside source of light.

Referring in detail to the drawings, 10 denotes a device embodying the invention. The same includes upper and lower heads 11 and 12 between which extends a tubular gauge glass 13, that is secured in the heads by the packing nuts 14. The said glass may be vertical or disposed at an angle therewith, and is preferably well adapted to withstand high pressures.

Coacting with the gauge glass 13 is a guard 15 including a plurality of members 16 upon opposite sides of the gauge glass and spaced from each other to provide narrow vertical openings 17 therebetween at the front and rear of the gauge glass. The space at the openings 17 is so narrow that, should the gauge glass break, there will be no likelihood of a piece of loose glass being projected through one of the said openings. Nevertheless the openings 17 are of sufficient width to permit observation of the water level in the gauge glass.

The members 16 are of any suitable form, but preferably in the nature of channels to possess a high degree of stiffness. The said channels may be standard forms, or of special construction as desired. Between the gauge glass and the channels is placed a suitable stuffing or packing material 18 to assure an even bearing between the gauge glass and the channels and to prevent too rapid thermal communication therebetween. The said packing may be mounted on the channels by cementing or the like. It is noted that the channels become hot, and act as a heat retaining means about the gauge glass, protecting the same against rapid cooling due to draft.

The said channels are mounted in any suitable manner upon the gauge and are drawn toward each other with a proper tension to protect and re-enforce the gauge glass. One form of the mounting includes a similar anchorage 19 at the top and bottom of the gauge. This anchorage comprises a block 20 secured to the end of the channel. Coacting with said block is a slidable holding means 21 which in the position shown in Fig. 1 is alongside the packing nut 14 so as to embrace the same. Thus the possibility is taken care of, of the gauge glass breaking and the guard being carried away with it. To permit the packing nut to be tightened the means 21 is slidable away from the packing nut as hereinafter more particularly described.

The slidable means 21 includes a pair of plates 22 which are slotted at 23 to receive a pin 24 that is secured to the adjacent block 20. The blocks 20 space the plate 22 to receive therebetween the packing nut 14, and the plates are slidable vertically along the blocks as a result of the pin and slot arrangement. To guide the plates for easy sliding movement, angles 25 are fastened to the said plates and slidingly contact opposite sides of the blocks 20.

The channels 16 are drawn together in any suitable manner, whether by a fixed non-elastic means, or by resilient means designed for a predetermined tension. The means referred to may be spaced as required along the guard to assure the requisite uniformity in re-enforcement of the gauge glass, if this be desired. Preferably I show coil springs 26, which may be disposed at the anchorage 19 if desired. One or more of these springs are mounted at the front and rear of the anchorage and detachably secured to the plates 22 by the pins 27.

To cause the anchorage 19 to enclose the packing nut 14 as aforesaid, a plurality of straps 28 and 29 are provided at right angles to the plates 22, and lying alongside the said packing nut. The first named strap has a plurality of slots 30 at the ends thereof, in which engage the headed pins 31 that fasten into the edge portions of the plate 22. The strap 29 has a plurality of openings 32 at the ends thereof, of which one is a keyhole slot 32a receiving headed pins 33 similar to 31. The slots 30 and 32, 32a are disposed on opposite sides of the plates 22, to the end that the plates 22 may be moved toward one another as shown by arrows 34 to permit the strap 29 to be unfastened after withdrawal of the head of a pin through the large end of the keyhole slots 32a. When the movement indicated by arrows 34 occurs, the channels move correspondingly. Then a pair of the springs 26 are detached at one end of each from the pins 27, and the guard may be removed from the gauge.

Coacting with the device 15 to project light through the gauge glass is an illuminator 35. This aims to provide a light which is substantially uniform throughout the length of the gauge glass. A large part of the light is not dissipated or lost, but being wholly confined to the gauge glass, a very small incandescent bulb may be used.

The illuminator 35 is mounted in any suitable manner to light through the narrow openings 17. It may include an elongated casing or reflector 36, carrying in an end thereof a source of light 37. The said casing may include telescopic sections 38, 39 to render it adjustable to any length of gauge. The casing may be of any suitable form, or round in cross section, and have longitudinal spaced lips 40. The side portions of the casings are adapted to be sprung toward each other to bring the said lips together to engage in one of the openings 17. The lips tend to move apart and thus have resilient engagement with the edge portions of the flanges of the channels. The base 41 of the bulb may extend laterally through the casing thus mounting the bulb and forming a convenient way for connecting the same into a circuit. To project the light through the casing reflector, a shield 42 is mounted on the bulb. To protect the latter against breakage, a glass disc 43 is placed in the casing over the bulb and held between ring members 44. The upper and lower ends of the casing may be open for cooling the bulb.

To obviate glare from an outside light source, a glare eliminator 45 is mounted in any convenient manner on the gauge, and comprises a hood 46 that is preferably vertically adjustable. The said hood includes integral U-shaped guides 47 that take over the channels and may be mounted in place by springing the sides of the hood apart, after which the said guides resiliently engage the guard. Since the hood is of substantially triangular form in vertical section, with the open base 48 lowermost, the operator can easily look in under the hood. With the improved lighting action of the illuminator a rapid and convenient reading of the gauge can be taken.

I claim:

1. A device of the character described, including a tubular glass adapted to hold a fluid under pressure, separate guard members all along opposite sides of the glass and in close contact therewith, said guard members being spaced to provide opposite narrow openings therebetween extending lengthwise of the glass for observation of the same, and means detachably holding the guard members around the glass.

2. A device of the character described, including a tubular transparent member adapted to hold a fluid under pressure, opaque separate guard members extending substantially from end to end of the tubular member, said members bearing laterally against the tubular member at points throughout the length thereof and providing narrow openings along the tubular member on opposite sides of the same for observation of the tubular member, and resilient means detachably holding the members together.

3. A device of the character described, including a tubular transparent member adapted to hold a fluid under pressure, upper and lower heads for the tubular member, opaque guard members extending along the tubular member substantially from end to end of the same in re-enforcing relation with the wall of the tubular member, said members having therebetween a longitudinally extending opening therealong whose width is less than a diameter of the tubular member, for observation of the same, and means laterally detachably engaging a guard member with a head.

4. A device of the character described, including a tubular glass adapted to hold a fluid under pressure, and a guard including a pair of opposite channel members extending along the glass in close relation thereto with the flanges of the channels projecting toward each other, the said flanges being spaced from each other to form opposite openings through which the glass can be observed.

5. A device as set forth in claim 4, in which packing is positioned between the glass and the channels, and resilient means draw the members together to compress the packing onto the glass.

6. A device as set forth in claim 2, including packing nuts for the tubular member, said resilient means being disposed on opposite sides of the packing nuts to hold the guard members in position thereagainst on breakage of the tubular member, the resilient means being releasable to permit the packing nuts to be tightened.

7. In a water gauge, a gauge glass, a source of light, and means confining the light from said source, said means extending along a side of the gauge glass and reflecting the light therethrough throughout the length of the gauge glass, said means being telescopic for adjustment according to the length of the gauge glass.

8. A device of the character described, including a tubular glass adapted to hold a fluid under pressure, and guard members all along opposite sides of the glass, said guard members being spaced to provide opposite narrow openings therebetween extending lengthwise of the glass for observation of the same, a source of light, and a reflector extending along the glass, said reflector communicating with one of said openings to reflect the light through the glass, said reflector having portions to mount the same engaging in the communicating opening at opposite sides of the latter.

9. In a water gauge, a gauge glass, a glare eliminator therefor, said glare eliminator comprising a hood to shield the gauge glass against light from the front of the gauge glass, said hood having a bottom opening through which the water level in the glass can be observed, and means mounting the glare eliminator for movement lengthwise of the glass.

10. In a water gauge, a gauge glass, a guard therefor, and glare eliminator mounted for movement longitudinally along the guard, said glare eliminator comprising a cover at the front of the gauge glass, said cover having an opening for observation of the water level in the gauge glass.

In testimony whereof I affix my signature.

GEORGE ERNST.